United States Patent [19]
Adel et al.

[11] Patent Number: 5,985,628
[45] Date of Patent: Nov. 16, 1999

[54] GENERATOR SWITCH

[75] Inventors: Ahmed Sherif Adel, Mannheim; Walter Weber, Viernheim; Horst Plettner, Hanau, all of Germany

[73] Assignee: ABB Patent GmbH, Manheim, Germany

[21] Appl. No.: 09/010,174

[22] Filed: Jan. 21, 1998

[30] Foreign Application Priority Data

Jan. 21, 1997 [DE] Germany .......................... 197 01 827

[51] Int. Cl.⁶ .................................................. H01H 33/66
[52] U.S. Cl. ............................................ 435/139; 435/120
[58] Field of Search .................................. 218/120, 119, 218/139, 140, 44, 78, 84, 152, 153, 154

[56] References Cited

U.S. PATENT DOCUMENTS

| | | | |
|---|---|---|---|
| 3,399,286 | 8/1968 | Kerr, Jr. ................................... | 218/152 |
| 3,814,881 | 6/1974 | Cherry et al. ............................ | 218/152 |
| 3,870,845 | 3/1975 | Clason .................................... | 218/152 |
| 4,538,039 | 8/1985 | Gotoh et al. ............................. | 218/152 |
| 4,879,441 | 11/1989 | Hamm et al. ........................... | 218/152 |
| 5,015,809 | 5/1991 | Wuthrich ................................. | 218/152 |
| 5,668,360 | 9/1997 | Perret et al. ............................. | 218/143 |

*Primary Examiner*—Lincoln Donovan
*Attorney, Agent, or Firm*—Herbert L. Lerner; Laurence A. Greenberg

[57] ABSTRACT

A generator switch includes phase conductors each equipped with one disconnector and one vacuum switch having a horizontally disposed pole gap. At least one vacuum chamber is provided per phase. The disconnector is constructed as a linear-travel disconnector, and the vacuum chambers are disposed spatially one behind the other, are aligned with the disconnector, and are each accommodated in one tubular housing which surrounds all of the components of a phase as an outer encapsulation.

15 Claims, 2 Drawing Sheets

GENERATOR SWITCH

BACKGROUND OF THE INVENTION

Field of the Invention

The invention relates to a generator switch including phase conductors each having one disconnector, one vacuum switch with horizontally disposed pole gaps and one drive device driving switching chambers.

A known generator switch is constructed in such a way that it has one inner conductor and outer encapsulation per phase. The outer encapsulation provides external screening for magnetic fields of the inner conductors. Due to that encapsulation, even relatively high currents are possible, so that generator switches can nowadays be used for rated currents up to about 50 kiloamperes. The inner conductors are tubular and may be rolled if their diameters are large. The outer encapsulation is likewise rolled, and both the inner conductor and the outer conductor are made of aluminum.

Compressed-air switches or $SF_6$ switches have been used as switching devices. A generator switch in which vacuum switching chambers are used has been disclosed in the Siemens Prospectus entitled "Vakuum-Generatorschalter Modul FG 10" [Vacuum generator switch module FG 10], Order No. E 50001U229-A19, 2.93 Standard. In that case, the vacuum chambers are located outside a central cable run, with only one vacuum switch (having three chambers) being accommodated in each phase line. A rotary disconnector is provided downstream of the vacuum switch, in the transformer direction.

The advantages of such vacuum chambers are a low maintenance requirement. However, because of DC/AC components close to the generator, vacuum chambers cause problems since there are no zero crossings, for which reason the Siemens Company has installed a time delay for the generator switch, in order to obtain a zero crossing.

SUMMARY OF THE INVENTION

It is accordingly an object of the invention to provide a generator switch, which overcomes the hereinafore-mentioned disadvantages of the heretofore-known devices of this general type and in which higher currents can be disconnected.

With the foregoing and other objects in view there is provided, in accordance with the invention, a generator switch comprising phase conductors; one tubular housing surrounding all of the components for each respective phase; one linear-travel disconnector for each respective phase; one vacuum switch for each respective phase with horizontally disposed pole gaps; one drive device for each respective phase; and at least one vacuum switching chamber driven by the drive device and aligned with the disconnector for each phase; the vacuum chambers and the disconnector of each phase disposed spatially or physically one behind the other and disposed in the tubular housing as an outer encapsulation.

If there is more than one vacuum chamber per phase, they are located symmetrically on a center axis, so that the disconnector is aligned with the center axis.

In accordance with another feature of the invention, the vacuum chambers are fixed on one side of a mounting plate which is secured in a fixed position in the housing and is used as an electrical distribution or electrical collector plate, and a stationary contact of the disconnector is located on the other side of the mounting plate. They are thus parallel to one another.

In accordance with a further feature of the invention, moving contact stems or stalks of the vacuum chambers are guided jointly in a fixed-position guide plate in such a way that they can be displaced in a moving manner and can make electrically conductive contact with the guide plate. Electrical conductors, for example in the form of conductor strips, are secured at one end to the outer periphery of the guide plate and are connected at the other end to a further fixed-position electrical collector plate.

In accordance with an added feature of the invention, there are provided roller contacts as electrical contacts between the contact stems and the guide plate. The conductors can intrinsically move, so that thermal expansion in the longitudinal direction is possible.

In accordance with an additional feature of the invention, the vacuum chambers in each phase are disposed in a triangular pattern for three vacuum chambers, in order to save space and to achieve optimum electrical distribution as far as possible.

In accordance with yet another feature of the invention, there is provided a common drive having the drive devices for each of the three phases of the circuit breaker, and transmission levers coupled to the common drive for driving the moving contact stems, the contact stems having ends passing through the guide plate and connected to the transmission levers.

In accordance with yet a further feature of the invention, there are provided transmission levers respectively coupled to the separate drive devices for each phase for driving the moving contact stems, the contact stems having ends passing through the guide plate and connected to the transmission levers.

In accordance with yet an added feature of the invention, there is provided a connecting plate coupling the moving contact stems, the transmission levers disposed between the connecting plate and the collector plate and supported on the collector plate and the connecting plate.

In accordance with yet an additional feature of the invention, the tubular housing has a transformer side end, a linear-travel disconnector housing is disposed at the transformer side end, and the linear-travel disconnector has a moving contact disposed in the linear-travel disconnector housing.

In accordance with again another feature of the invention, there is provided a voltage converter disposed in the vicinity of the linear-travel disconnector housing.

In accordance with again a further feature of the invention, the tubular housing has a generator side end, an inner conductor section is disposed between the collector plate and the generator side end, and a further voltage converter is disposed in the vicinity of the inner conductor section.

In accordance with again an added feature of the invention, the voltage converters are suspended within the tubular housing.

In accordance with again an additional feature of the invention, there are provided current transformers each surrounding a respective one of the linear-travel disconnector housing and the inner conductor section in the vicinity of a respective one of the ends of the tubular housing.

In accordance with still another feature of the invention, the tubular housing has an overpressure, preferably of substantially 0.5 mbar, therein.

In accordance with a concomitant feature of the invention, there is provided at least one grounding switch grounding the linear-travel disconnector housing and/or the inner conductor section.

Other features which are considered as characteristic for the invention are set forth in the appended claims.

Although the invention is illustrated and described herein as embodied in a generator switch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 3:
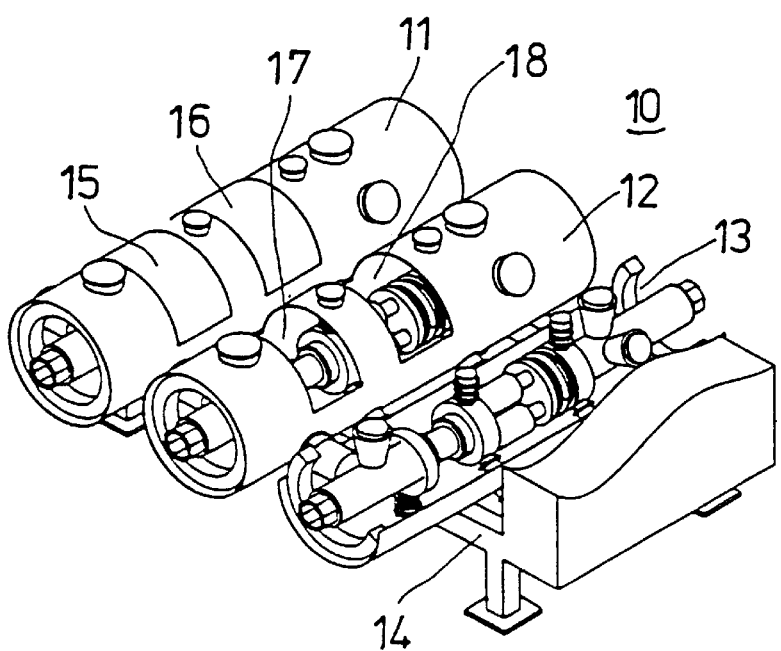
FIG. 3 is a partly broken-away, perspective view of a three-pole generator switch, which is composed of three devices according to FIGS. 1 and 2 located side by side.

Referring now to the figures of the drawings in detail and first, particularly, to FIG. 3 thereof, there is seen a three-pole generator switch 10 with three switch poles 11, 12 and 13 representing phase conductors and being mounted on a framework 14 that is placed on the ground or on a steel structure which is not illustrated.

The switch pole 11 is closed by covers 15 and 16 in the form of circular arcs which are provided. These covers 15 and 16 have been removed from the switch pole 12 and access openings 17 (to a disconnector) and 18 (to a circuit breaker) can be seen. A housing of the switch pole 13 is cut away.

One of the switch poles will be described in the following text with reference to FIG. 1, for example the switch pole 11. The other switch poles are of identical construction.

Figure 1:
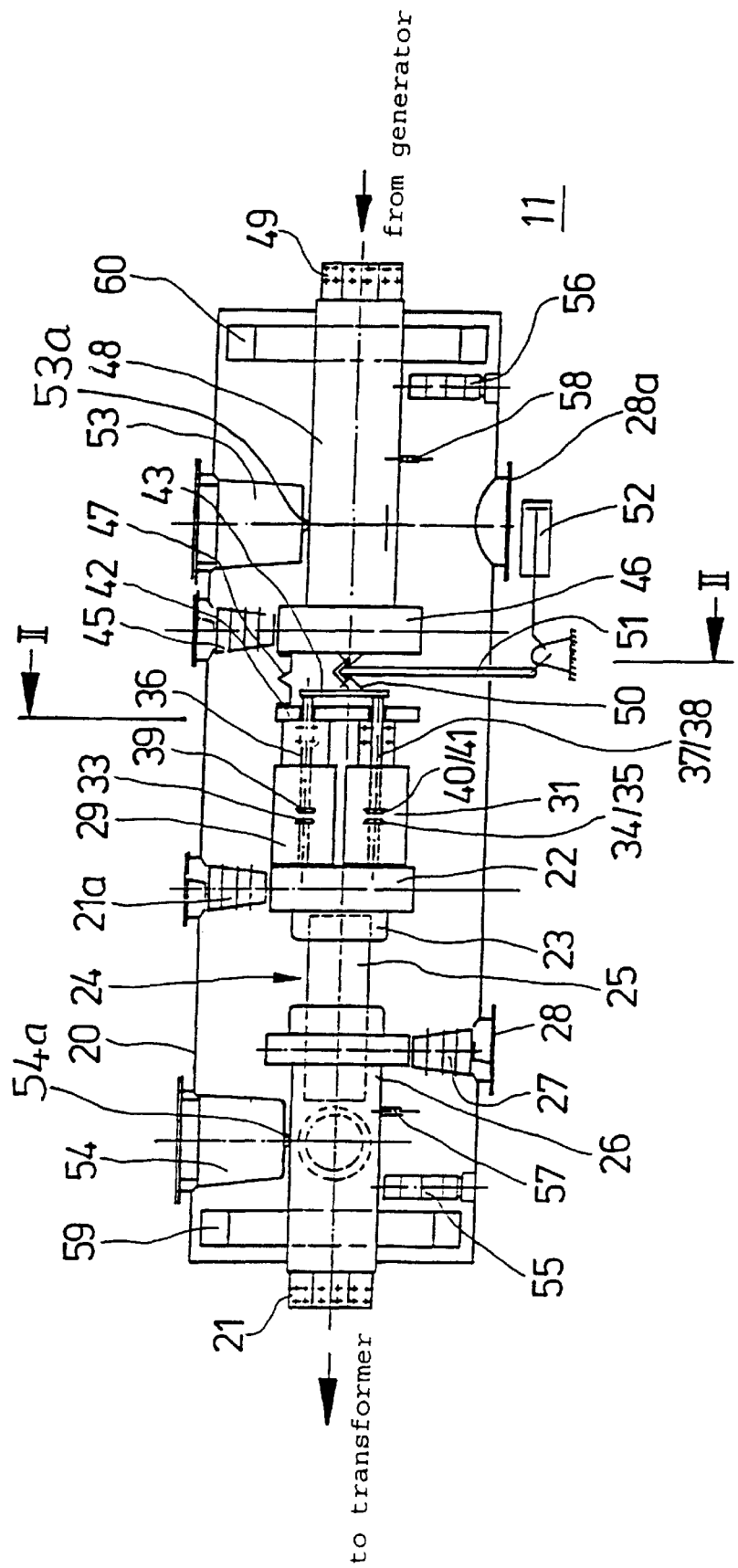
FIG. 1 is a diagrammatic, longitudinal-sectional view of a generator switch for one phase.

Reference will now be made to FIG. 1. A cable run 21 which is located inside a tubular housing 20 is used as an outer encapsulation, is produced from rolled aluminum, leads to a transformer on the left and is connected to a generator on the right. A supporting insulator 21a is mounted approximately centrally on a surface line located at the top in FIG. 1, and a circular electrical distribution plate 22 is secured thereto. A linear-travel disconnector 24 has a stationary contact 23 located on the transformer side of the electrical distribution plate 22 and a moving contact 25 which is accommodated in a switch housing 26 that is held by a supporting insulator 27. The supporting insulator 27 is secured to the housing 20 in a connecting piece 28 with a flange. The housing 20 itself is mounted on the framework 14 which is not illustrated in FIG. 3.

Figure 2:
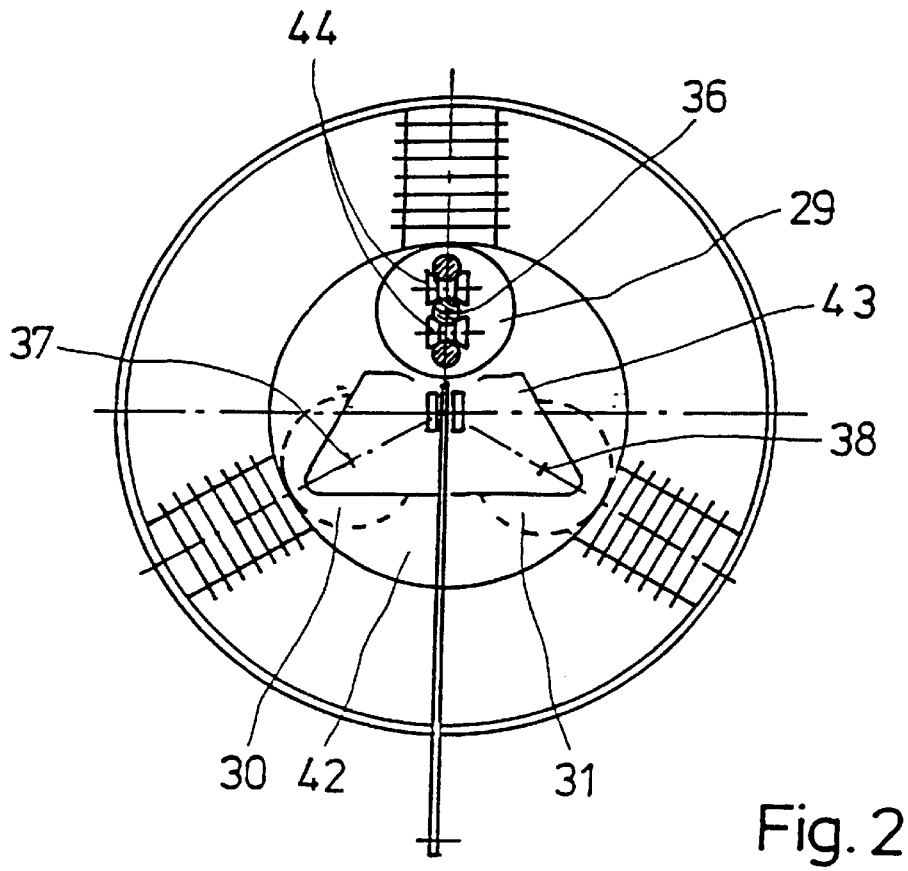
FIG. 2 is a cross-sectional view taken along a line II—II of FIG. 1, in the direction of the arrows.

The electrical distribution plate 22 is fitted on the side opposite the disconnector 24 with three vacuum chambers 29, 30 and 31, of which only the two vacuum chambers 29 and 31 can be seen in FIG. 1. The vacuum chambers each have a stationary contact 33, 34, 35 as well as a moving contact 39, 40, 41 which is secured to a contact stem or stalk 36, 37, 38. Elements 29–31, 33–35 and 39–41 together form vacuum switches with pole gaps. The contact stems 36, 37 and 38 are guided in a guide plate 42 which is likewise disposed in a fixed position. Ends of the contact stems 36, 37 and 38 which pass through the guide plate 42 are rigidly connected to one another through the use of a triangular connecting plate 43, and contact is made between the contact stems 36, 37 and 38 and the guide plate 42 through the use of roller contacts 44. FIG. 2 shows only the roller contacts 44 which are associated with the contact stem 36. The connecting plate 43 may also be circular.

A further electrical collector plate 46 is located on a further supporting insulator 45, which is suspended from top to bottom and is thus likewise accommodated in a fixed position in the housing 20. Electrical conductors 47, for example in the form of strips, are located between the guide plate 42 and the electrical collector plate 46, are distributed uniformly around the circumference and allow axial movement of the vacuum chambers with respect to further components. An inner conductor section 48 which is connected to the electrical collector plate 46 projects out of the housing 20 and is connected by screw connections 49 to a generator leakage or outgoer, which is not illustrated.

Transmission levers 50, which are located between the connecting plate 43 and the electrical collector plate 46, are connected to a drive rod 51 that is coupled to a drive 52 for operating the vacuum chambers of all three phases. Elements 50, 51 and 52 thus form a drive device. A voltage converter 53 is located above the inner conductor section 48, a voltage converter 54 is located above the linear-travel disconnector housing 26, and grounding switches 55 and 56 in each case are located underneath the inner conductor, within the housing 20. The grounding switches 55 and 56 are only diagrammatically illustrated. In this case, they interact with stationary contacts 57 and 58 on the linear-travel disconnector housing 26 and on the inner conductor section 48. Contact is made between the voltage converter 53 and the inner conductor section 48 through the use of a spring-mounted or sprung contact pin 53a, and contact is made between the voltage converter 54 and the linear-travel disconnector housing 26 through the use of a spring-mounted or sprung contact pin 54a. Capacitors which are associated with the vacuum chambers 29, 30, 31 are not illustrated.

A current transformer 59 is located within the housing 20 and disposed around the linear-travel disconnector housing 26 in the region of the end of the housing on the transformer side. A further current transformer 60, which surrounds the inner conductor section 48, is seated on the opposite end of the housing on the generator side.

The vacuum chambers 29, 30 and 31 form a unit which can be assembled in advance with the first electrical distribution plate 22 and the stationary contact 23 of the linear-travel disconnector 24 as well as with the guide plate 42.

The outer encapsulation formed by the housing 20 is integrally constructed in such a way that the individual switch poles are encapsulated as single phases, which results in further advantages: there is no direct risk of short circuit, magnetic screening is also achieved and eddy currents are avoided, as a result of which the amount of heating can be controlled. In addition, protection is achieved against touching and against soiling, and dynamic forces are reduced.

In order to maintain freedom from dust within the housing 20, the housing can be subjected to a small internal over-pressure of about 5 mbar. A further connecting piece 28a corresponds to the connecting piece 28, likewise for a supporting insulator.

We claim:

1. In a generator switch including phase conductors, the improvement comprising:

one surrounding tubular housing as an outer encapsulation for each respective phase;

one linear-travel disconnector having a stationary contact for each respective phase;

one vacuum switch with horizontally disposed pole gaps for each respective phase;

a mounting plate having two sides, secured in a fixed position in said housing and used as an electrical distribution plate;

a fixed-position guide plate having an outer periphery, a fixed-position electrical collector plate, moving contact stems guided in said guide plate for displacement and movement to make an electrically conductive contact with said guide plate, and electrical conductors having two ends, one of said two ends of said electrical conductors secured to said outer periphery of said guide plate and one of said two ends of said electrical conductors connected to said collector plate;

one drive device for each respective phase; and at least one vacuum chamber driven by said drive device and aligned with said disconnector for each phase, said at least one vacuum chamber fixed on one of said two sides of said mounting plate, said stationary contact of said disconnector fitted on the other side of said two sides of said mounting plate; and said at least one vacuum chamber and said disconnector disposed in said tubular housing and spatially in line with each other.

2. The generator switch according to claim 1, wherein said at least one vacuum chamber includes three vacuum chambers for each phase fitted in a triangular pattern on said mounting plate.

3. The generator switch according to claim 1, including roller contacts producing the electrically conductive contact between said moving contact stems and said guide plate.

4. The generator switch according to claim 3, including a common drive having said drive devices for each of the three phases, and transmission levers coupled to said common drive, said contact stems having ends passing through said guide plate and connected to said transmission levers.

5. The generator switch according to claim 3, including transmission levers respectively coupled to said separate drive devices for each phase, said contact stems having ends passing through said guide plate and connected to said transmission levers.

6. The generator switch according to claim 4, including a connecting plate coupling said moving contact stems, said transmission levers disposed between said connecting plate and said collector plate and supported on said collector plate and said connecting plate.

7. The generator switch according to claim 5, including a connecting plate coupling said moving contact stems, said transmission levers disposed between said connecting plate and said collector plate and supported on said collector plate and said connecting plate.

8. The generator switch according to claim 1, wherein said tubular housing has a transformer side end, a linear-travel disconnector housing is disposed at said transformer side end, and said linear-travel disconnector has a moving contact disposed in said linear-travel disconnector housing.

9. The generator switch according to claim 8, including a voltage converter disposed in the vicinity of said linear-travel disconnector housing.

10. The generator switch according to claim 9, wherein said tubular housing has a generator side end, an inner conductor section is disposed between said collector plate and said generator side end, and a further voltage converter is disposed in the vicinity of said inner conductor section.

11. The generator switch according to claim 10, wherein said voltage converters are suspended within said tubular housing.

12. The generator switch according to claim 10, including current transformers each surrounding a respective one of said linear-travel disconnector housing and said inner conductor section in the vicinity of a respective one of said ends of said tubular housing.

13. The generator switch according to claim 1, wherein said tubular housing has an overpressure therein.

14. The generator switch according to claim 13, wherein said overpressure is substantially 0.5 mbar.

15. The generator switch according to claim 10, including at least one grounding switch grounding at least one of said linear-travel disconnector housing and said inner conductor section.

* * * * *